United States Patent [19]
Bell, Jr.

[11] 3,777,102
[45] Dec. 4, 1973

[54] ELECTRICAL DISCHARGE MACHINING POWER SUPPLY CIRCUIT

[75] Inventor: Oliver A. Bell, Jr., Mooresville, N.C.

[73] Assignee: Colt Industries Operating Corp., New York, N.Y.

[22] Filed: July 19, 1972

[21] Appl. No.: 273,294

[52] U.S. Cl............................................ 219/69 C
[51] Int. Cl............................................ B23p 1/08
[58] Field of Search ............. 219/69 C, 69 P, 69 G, 219/69 V; 335/185, 195

[56] References Cited
UNITED STATES PATENTS

| | | | |
|---|---|---|---|
| 3,627,967 | 12/1971 | Bertolasi | 219/69 C X |
| 3,243,567 | 3/1966 | Lobur | 219/69 C |
| 2,273,819 | 2/1942 | Cooke et al. | 219/69 V |
| 2,951,142 | 8/1960 | Ullmann | 219/69 C |
| 2,623,136 | 12/1952 | Mekelburg et al. | 335/185 X |
| 3,624,338 | 11/1971 | Ellis et al. | 219/69 C |

*Primary Examiner*—R. F. Staubly
*Attorney*—Robert C. Hauke et al.

[57] ABSTRACT

A circuit for machining in a multiple gap set-up with multiple electrodes and a common workpiece or multiple electrodes and a like number of workpieces connected in circuit with a common source power supply circuit. A system is provided for reversing the polarity of electrode relative to workpiece in which the switching changeover is accomplished in the leads associated with the power source and the output switches themselves. Additionally, the circuit incorporates a special high gain current amplifier stage and a network controlling the output switch triggering which incorporates an RC network for one polarity of cutting, which network is shunted by a selectively operated switching means for the other polarity of machining.

6 Claims, 1 Drawing Figure

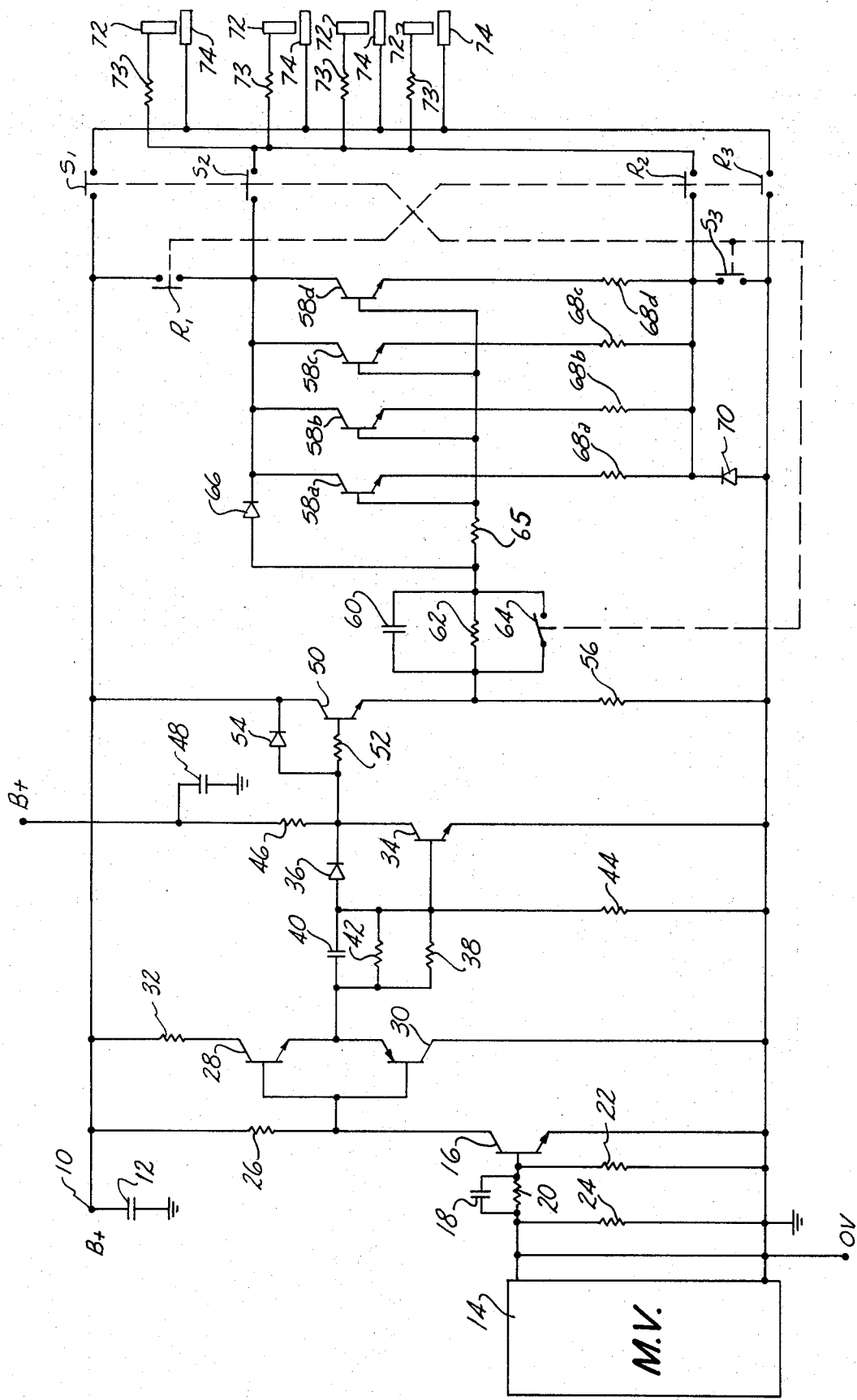

ELECTRICAL DISCHARGE MACHINING POWER SUPPLY CIRCUIT

BACKGROUND OF THE INVENTION

The field to which my invention relates is that known as electrical discharge machining, in which material is removed from an electrically conductive workpiece by the action of electrical gap discharges between one or more tool electrodes and the workpiece. A servo feed system is employed to provide relative movement and to maintain an optimum gap spacing between electrode and workpiece as material is progressively removed from the workpiece. A dielectric coolant fluid is circulated and recirculated, usually under pressure, through the gap during machining operation. For most reliable and predictable results, a power supply of the independent pulse generator type is utilized to provide machining power pulse of precisely controllable frequency and on-off time. Included in the independent pulse generator supply is a triggering pulse source, such as multivibrator, used to generate the necessary triggering pulses.

During machining operation, it is sometimes necessary to change the gap polarity in accordance with the selection being made of electrode material and changeover being made with respect to the workpieces machined. For example, in electrical discharge machining of some workpiece materials, it is desirable to use copper electrodes, in which case the polarity will be standard with the electrode being negative and the workpiece positive. For other workpiece materials, it is preferred to use graphite electrodes, in which case the polarity will be that commonly referred to as "reverse" in which the electrode is positive and the workpiece negative. It is necessary that any machining power supply have the capability of changeover as between the two possible polarities to accommodate the broadest possible range and variety of machining operations. A number of prior art systems are known in which relay switching systems are used in direct conjunction with the gap leads to connect and disconnect these and thus alter the gap lead arrangement of the system. Other systems make only a simple provision for changeover through lead connections with manual connect and disconnect to achieve the desired gap polarity.

SUMMARY OF THE PRESENT INVENTION

The present invention relates to a polarity changeover system specially useful in connection with a multiple machining set-up in which there are a plurality of electrodes and workpieces so that the polarity changeover involved is relatively complicated. The present invention provides for the changeover by a switching means connected directly in series with the principal electrode of the output transistor switch bank so that by one simple switching set-up it is possible to change at the same time the polarity of all the different gaps included. Additionally, a ganged switching means is included in the drive lead providing the triggering pulses to the output switch control electrodes, which automatically makes the necessary change in input signal to drive the output switches in the different mode provided according to the polarity connection.

BRIEF DESCRIPTION OF THE DRAWING

Reference is now made to the accompanying specification for a description of the circuit incorporating the present invention, with like numerals being used to identify like parts as they may appear in the circuit. The drawing is a combined schematic and block diagrammatic showing of a complete electrical discharge machining power supply circuit except that the triggering pulse source, which may be incorporated as a free running or one-shot multivibrator, is shown in block diagram form.

DESCRIPTION OF THE PREFERRED EMBODIMENT

Referring now to the drawing, a main machining power B+ source 10 is shown together with a filter capacitor 12. It will be understood that the main DC source for an electrical discharge machining power supply is usually derived from an AC input with a full wave rectifier and filter included. The source of triggering pulses for the power supply circuit is shown in block form as a multivibrator 14. An example of one type of free running multibrator, which is suitable for incorporation in the present circuit, is illustrated in Sennowitz U.S. Pat. No. 3,514,837 issued on May 26, 1970 for "Electrical Discharge Machining Power Supply Circuit," which patent is of common ownership with the instant application. The output of the multivibrator 14 is referenced to the zero voltage level and passed through a parallel RC network to the base of the next following drive transistor stage which includes a transistor 16. The RC triggering network includes a capacitor 18 and a resistor 20 used to minimize storage time delay. A suitable bias is connected to the base of the transistor 16 through a resistor 22. A resistor 24 is connected to ground in the manner known. A load resistor 26 is connected in series with the collector of the transistor 16. The next following stage in the power supply circuit is a high gain current amplifier stage which includes a pair of complementary transistors 28 and 30, in which the transistor 28 is an NPN transistor and the transistor 30 is a PNP transistor. A resistor 32 is connected between the B+ potential source and the collector of the transistor 28. The amplified current output signal is then passed to the next following transistor stage including the transistor 34. A clamping diode 36 is connected in circuit across the collector and base of the transistor 34. The input network to the base of the transistor 34 includes a current limiting resistor 38 and a parallel RC network including a capacitor 40 and a resistor 42. Bias is provided to the base of the transistor 34 through a bias resistor 44. B+ voltage source is connected to the collector of the transistor 34 through a resistor 46. A filter condenser 46 is connected as shown. The next following stage of the power supply circuit includes a transistor 50 having a resistor 52 in series with its base and a protective diode 54 coupled as shown. A load resistor 56 is shown connected in series with the emitter of the transistor 50. The final stage of the power supply circuit is the output switch bank which includes a plurality of NPN type transistors 58a, 58b, 58c and 58d. While the circuit illustrating the present invention employs transistors as electronic switches, the invention is not intended to be so limited, but with proper redesign of the circuit and its components by one skilled in the art other electronic switches may be substituted.

By the term "electronic switch" is meant any electronic control device having three or more electrodes comprising at least two power electrodes acting to control current flow in the power circuit, the conductivity in the power circuit being controlled by a control electrode within the switch, whereby the conductivity of the power circuit is controlled statically or electrically without the movement of any mechanical elements within the switch. Included within this definition are vacuum tubes, transistors and other like devices.

The triggering pulses from the preceding stage to the output stage are passed through a parallel RC network including a capacitor 60 and a resistor 62, while the network is shunted by a switch 64 for a purpose to be explained hereinafter. Also connected in series with the control electrodes, that is the bases of the output transistors 58a–58d, is a current limiting resistor 65. A diode 66 is also connected across the collector and base junction of the several output transistors. A resistor is connected in series with the emitters of each of the transistors 58a–58d with the numerals 68a, 68b, 68c and 68d being applied to the respective resistors. A clamping diode 70 is included in the gap circuit. A series current limiting resistor 73 is connected in series with each gap. The actual machining gap circuits include four electrodes 72, each of which may have a common opposed workpiece 74, or, as illustrated, the four electrodes 72 may be used to machine concurrently cavities in four separate workpieces 74.

In the embodiment of the invention illustrated, four coolant-filled gaps are in operation all at the same time as machining is carried on. The polarity reversal switches, which are preferably relay operated, are illustrated all in the open position preparatory to the selection of either polarity of machining. Those switches which are closed during a reverse polarity, that is with the electrode positive and the workpiece negative, are identified by the letter R, while those switches which are closed during the opposite standard polarity operation are identifed by the letter S. The switch 64 is shown operable in ganged relationship with the S or standard polarity switches. During the standard polarity connection, the switch 64 will be placed in the open position, whereas in the reverse polarity operating condition the switch 64 will be held closed.

DESCRIPTION OF OPERATION

During standard polarity operation, all of the switches $S_1$, $S_2$ and $S_3$ will be relay actuated and placed into their closed position. The $S_1$ switch will serve to connect the positive voltage source, indicated at the terminal 10, to each of the workpieces 74 at the right hand side of the drawing. At the same time, the contact switch contacts $S_2$ will be closed to connect each of the electrodes 72 to the collector bus of the output transistors 58a–58d. In addition, the switch $S_3$ will be closed to connect the emitters of each of the output transistors 58a–58d to ground. Accordingly each time the bases of the output transistors 58a–58d receive a triggering pulse they initiate a pulse across each of the gaps between each workpiece 74 and electrode 72 with current flow through each of the transistors 58a–58d through the associated series resistor and to ground. It will thus be seen that one of the advantages to be derived from such an arrangement is that with a single switching of three switch movable contact sets it is possible to preset the polarity of an almost unlimited number of machining gaps.

In the reverse polarity operating condition, the switches $S_1$, $S_2$ and $S_3$ are left in their normally open position, while the switches $R_1$, $R_2$ and $R_3$ are closed to alter the connections to the gaps to the opposite condition. Otherwise stated, the positive voltage at the terminal 10 is passed through each of the output transistors 58a–58d collector to emitter through the associated emitter load resistors 68a–68d and thence to each of the electrodes 72 and across the associated gap, with the return being through the switch $R_3$ to ground.

The switch 64, already referred to, is ganged either with the relay or common operator for the S switches or the R switches in such manner that the switch 64 is opened during standard polarity and closed during reverse polarity to control the triggering input to the base of the output transistors 58a–58d. If the output transistors 58a–58d are operated in the high impedance, emitter follower configuration, then it is desirable to have the switch 64 closed.

It will thus be seen that the present invention provides a substantially improved machining power supply particularly adaptable for multiple gap machining and in which polarity reversal is easily effectuated with a novel arrangement of control switches.

What is claimed is:

1. an electrical discharge machining apparatus for machining a conductive workpiece by providing electrical discharges between it and a tool electrode across a dielectric coolant-filled gap, a power supply circuit for providing machining power pulses across a plurality of gaps at the same time, said power supply circuit including a source of triggering pulses, a machining power source, a plurality of electronic switches having their principal electrodes connected respectively in parallel and between a like terminal of said source and one terminal of said gap, said triggering pulse source connected to the control electrodes of each of said electronic switches for turning them on in unison, a relatively high gain current amplifier of the push-pull type connected between said triggering pulse source and said control electrodes for increasing the magnitude of said triggering pulses, a parallel resistor-capacitor network further connected between said amplifier and said control electrodes, a selectively operated system included for controlling the polarity of said tool electrode relative to said workpiece, said system including a first switching means connected between one terminal of said source and said workpiece, a second switching means connected between like principal electrodes of said electronic switches and said tool electrodes, a third switching means connected between the other principal electrodes of said switches and ground to provide one polarity of gap machining, and a fourth switching means shunted across said parallel resistor-capacitor network, said fourth switch being opened and closed according to the polarity with which said gap elements are being connected.

2. The combination as set forth in claim 1 wherein a second set of three switching means is included in circuit and actuable to provide the opposite polarity of gap machining, the first of said second set of switching means connected said in series between said source terminal and said other principal electrodes of said output switches, the second of said switching means connected between the other principal electrodes of said output switches and said tool electrodes, and the third of said switching means connected between the workpiece and ground.

3. The combination as set forth in claim 2 wherein said electronic switches comprise NPN type transistors and said first set of three switches are all closed to provide "standard" polarity electrical discharge machining with the tool electrode negative relative to the workpiece.

4. The combination as set forth in claim 2 wherein said electronic switches comprise NPN type transistors and said second set of three switches are all closed to provide "reverse" polarity electrical discharge machining with the tool electrode positive relative to the workpiece.

5. In an electrical discharge machining apparatus for machining a conductive workpiece by providing electrical discharges between it and a tool electrode across a dielectric coolant-filled gap, a power supply circuit for providing machining power pulses across a plurality of gaps at the same time, said power supply circuit including a source of triggering pulses, a common machining power source, a plurality of NPN transistors having their collectors and emitters connected respectively in parallel and connectible between a positive terminal of said machining power source and one terminal of said gap, said triggering pulse source connected to the bases of each of said transistors for turning them on in unison, a system for controlling the polarity of said tool electrodes relative to said workpiece, said system including a first set of switching means comprising a first switching means connected between said positive terminal of said source and said workpieces, a second switching means connected between the collectors of said electrodes and said tool electrodes, a third switching means operably connected between the emitters of said transistors and ground, a means for closing said three switching means to provide a standard polarity of gap machining with the tool electrode negative and workpiece positive, a second set of three switching means included in said circuit for providing reverse polarity of gap machining, said second set of switches comprising a first switching means connected in series between said positive source terminal and said collectors of said transistors, a second switching means connected between the emitters of said transistors and said tool electrodes, a third switching means connected between said workpiece and ground, means for closing said second set of switches, a resistor-capacitor network connected in series with the bases of said output transistors for decreasing switching storage time, and said resistor-capacitor network shunted by a fourth switch, said fourth switch actuable to an open position in the standard polarity connection.

6. In an electrical discharge machining apparatus for machining a conductive workpiece by providing electrical discharges between it and a tool electrode across a dielectric coolant-filled gap, a power supply circuit for providing machining power pulses across a plurality of gaps at the same time, said power supply circuit including a source of triggering pulses, a common machining power source, a plurality of transistors having their respective collectors and emitters coupled in parallel and connectible between one terminal of said machining power source and one terminal of said gap, said triggering pulse source connected through a parallel resistor-capacitor network to the control electrode of each of said transistors for turning them on and off in unison, and a system for controlling the polarity of said tool electrodes relative to said workpieces in said gaps, said system including a set of switching means comprising a first switching means connected between said terminal of said source and said workpieces, a second switching means connected between the collectors of said transistors and said tool electrodes, a third switching means operably connected between the emitters of said transistors and ground, a fourth switching means shunted across said resistor-capacitor network, and a means for actuating said set of switching means at the same time to provide a predetermined polarity of gap machining.

* * * * *